United States Patent [19]
Tortola et al.

[11] Patent Number: 5,165,779
[45] Date of Patent: * Nov. 24, 1992

[54] COMPACT COMBINED LIGHT AND MAGNIFIER APPARATUS FOR A HAND-HELD COMPUTER WITH VIDEO SCREEN AND METHOD

[75] Inventors: Angelo Tortola, Lexington; Robert Howitt, Leominster, both of Mass.

[73] Assignee: Curtic Manufacturing Company Inc., Jaffrey, N.H.

[ * ] Notice: The portion of the term of this patent subsequent to May 26, 2009 has been disclaimed.

[21] Appl. No.: 863,589

[22] Filed: Apr. 3, 1992

Related U.S. Application Data

[63] Continuation-in-part of Ser. No. 771,728, Oct. 4, 1991, Pat. No. 5,117,339, which is a continuation-in-part of Ser. No. 678,265, Apr. 19, 1991, Pat. No. 5,091,832.

[51] Int. Cl.⁵ ............................................. F21V 33/00
[52] U.S. Cl. .................................... 362/109; 362/191; 362/234; 273/148 B; 248/917
[58] Field of Search ........................ 362/23, 28, 84, 85, 362/99, 109, 191, 234, 253, 396, 455; 340/700; 248/917, 918; 273/85 R, 85 G, 148 B, 434

[56] References Cited

U.S. PATENT DOCUMENTS

| | | | |
|---|---|---|---|
| 4,359,222 | 11/1982 | Smith, III et al. | 273/85 G |
| 4,772,986 | 9/1988 | McNemor | 362/28 X |
| 4,893,222 | 1/1990 | Mintzer | 372/23 X |
| 4,991,935 | 2/1991 | Sakurai | 248/917 X |
| 5,115,383 | 5/1992 | Lee | 273/85 G |
| 5,117,339 | 5/1992 | Tortola et al. | 362/109 |

*Primary Examiner*—Stephen F. Husar
*Attorney, Agent, or Firm*—Richard P. Crowley

[57] ABSTRACT

A compact, portable combined light and magnifier apparatus and method for use with portable computer, such as a portable, hand-held video game, having a video screen, such apparatus comprises a body composed of a plurality of panels which define an open space generally the size of the video screen and a battery compartment to supply power and lighting means within the body to provide indirect lighting to the video screen, the body and the battery compartment containing ridges which provide for the body to be releasably secured to the computer with the video screen. The apparatus includes a cover to fit over the open viewing space of the body and pivotable between a closed, compact position adjacent the face side of the body and an open, use position extending generally perpendicularly outwardly from the face side of the body. The magnifier portion comprises a frame and a magnifying lens secured within the frame, the lens adapted to conform generally with the computer video screen, the frame pivotably secured within the cover and adapted to move between a compact, stored position within the cover and a magnifying, use position extending generally perpendicularly from the face of the body to place the magnifying lens a defined, fixed distance directly over the video screen.

14 Claims, 5 Drawing Sheets

COMPACT COMBINED LIGHT AND MAGNIFIER APPARATUS FOR A HAND-HELD COMPUTER WITH VIDEO SCREEN AND METHOD

REFERENCE TO PRIOR APPLICATIONS

This application is a continuation-in-part of U.S. patent application Ser. No. 07/771,728, filed Oct. 4, 1991, now U.S. Pat. No. 5,117,339, which is a continuation-in-part of U.S. patent application Ser. No. 07/678,265, filed Apr. 19, 1991, now U.S. Pat. No. 5,091,832, issued Feb. 25, 1992 (national phase of PCT/US90/03966, filed Jul. 11, 1990) disclosing a light apparatus for use with a compact computer video screen, which application and patent are hereby incorporated by reference in its entirety. The light apparatus is also shown in U.S. Design Pat. No. D316,454, issued Apr. 23, 1991.

The parent application, Ser. No. 07/678,265, now U.S. Pat. No. 5,091,832, is directed to a portable, compact, battery-operated light apparatus for use with a compact computer game having an LCD video screen. The light apparatus enhances the visibility of the video screen in use. The light apparatus comprises a body with a battery compartment and having side panels which define an open viewing space which generally mimic in size and dimension the video screen and has lights provided in the body element to provide for indirect of the video screen in the viewing space. The light apparatus includes a battery compartment adapted to receive batteries as a power source for the light and includes attachment means, such as raised ridges on the top surface of the body and on the bottom surface of the battery compartment so that the light apparatus may be releasably secured in a correct position above the video screen of the computer.

Reference is also made to U.S. Design patent application Ser. No. 639,713, filed Jan. 8, 1991 and U.S. patent application Ser. No. 713,808, filed Jun. 12, 1991, now U.S. Pat. No. 5,119,239 directed to a magnifying apparatus and method for hand-held video display assigned to the assignee of the present application and hereby incorporated by reference in their entirety. The utility application is directed to a magnifying apparatus for use with a hand-held video display apparatus of the same type with which the light apparatus is used and which magnifying apparatus is a frame with a magnifying lens secured therein. The frame is secured to a support, the legs of the support releasably adapted to be secured in a snap-in relationship to grooves in the opposite sides of the housing of the video display apparatus so as to place the support in an upright position. The frame with the magnifying lens is adapted to move between an open, use position directly over the screen of the video display apparatus and a closed, non-use position nestled within the legs of the support.

BACKGROUND OF THE INVENTION

Hand held, portable, battery-operated computer devices which typically display information or play games and employ a video screen, such as a flat, LCD screen, are quite popular. Such devices would include, but not be limited to: calculators; computer video games; lap top computers; and other computers, particularly a compact video game known as the Game Boy ® (a trademark of Nintendo of America, Inc.) is a self-sustained computer video game system. This compact video game system provides a battery-operated, portable, hand-held computer with a cross key "joy stick" to operate the game and "Start" and "Select" buttons with a video screen coupled with volume control so as to display and enable the user to display images and play games from inserted software. The video display screens of such hand-held computers are often difficult to observe in partial light conditions due to lack of adequate illumination on the video screen. The portable, compact light apparatus of the parent application has been developed to provide adequate illumination of the video screen.

In addition, one disadvantage in many of the hand-held, portable video display devices, such as the Game Boy ® device, is the small size of the video display screen, while in addition, the images on the screen are often small sized figures, characters, words or instructions which are difficult to see and which therefore affects the efficiency and pleasure of the operation of the video display apparatus by the user.

Various magnifying devices have been proposed for use with hand-held video display apparatus for use with LCD screens and TV devices, such as for example, U.S. Pat. No. 4,443,819, issued Apr. 17, 1984 and U.S. Pat. No. 4,991,935, issued Feb. 12, 1991. The prior application of the same assignee is directed to an improved magnifying apparatus for use particularly with the Game Boy ® hand-held video game device.

The present light apparatus to enhance the indirect lighting of the video screen of a hand-held computer device and the portable magnifier lens apparatus to magnify the images on the video screen referred to in the Reference to Prior Applications are separately employed and attached to the hand-held computer device and of such nature and structure that they cannot be used together. It is desirable to provide an improved, combined, compact, portable light apparatus and magnifying apparatus for use with a hand-held computer device with a video screen to provide light for the video screen and also to enhance the magnification of the video screen.

SUMMARY OF THE INVENTION

The present invention is directed to a combined light and magnifying apparatus and a method of use. In particular, the invention relates to compact, portable, combined light and magnifying apparatus for use with a hand-held computer having a video screen to provide indirect lighting to the video screen and to magnify the images on the video screen and to a method of lighting and magnifying a video screen.

A compact, portable, combined light and magnifying apparatus and method has been discovered for use with a portable, hand-held computer having a video screen, such as an LCD screen, and more particularly, for use with a hand-held, portable computer game system, such as a Game Boy ® device. The light and magnifying apparatus provides for a combined light and magnifying apparatus which is portable and easily secured to the computer device in a snap-in, releasable manner and which provides for pivotable movement from a stored position to an extended use position and for the movement of a frame and magnifier within the cover from a stored position to an extended use position directly over the lighted video screen to provide both indirect or direct lighting to the video screen and magnification of the information on the video screen.

The combined light and magnifying apparatus of the invention comprises a light apparatus to enhance the view of the video screen, which light apparatus has a body having a one and the other end and a face and bottom side and has a plurality of panels, such as light-colored, short, extended panels about the sides, to define an open video viewing space within the body. The video viewing space is adapted to conform generally to the size and dimensions of the computer video screen to be lighted by the light apparatus. The light apparatus includes a power source for the lights, for example, a battery power source from the power source of the hand-held computer or separate or integral batteries with the light-magnifier apparatus. In one embodiment, the light apparatus includes a battery compartment integrally secured to the body, generally at the one end, and having an extended bottom surface and which battery compartment is adapted to receive one or more batteries as a power source for the light apparatus. The light apparatus includes a lighting means to light up one or more surfaces of the side panels, typically, opposing side panels, to have reflective light from the lighting means powered by the batteries to enhance the viewing of the video screen of the computer device. Typically, the panels which make up the body are formed in a generally square or rectangular, upright, vertical position extending vertically or at a slight angle from the face of the video screen of the computer device and small light bulbs are placed on either side directly behind the reflective side panels, generally on opposing sides, to provide reflected light on to the computer video screen. The light apparatus includes an electrical "on/off" switch to control the power from the batteries in the battery compartment and includes electrical circuitry to connect the lights through the electrical switch to the battery compartment.

The light apparatus also includes an attachment means to secure in a releasable manner, such as a snap in manner, the body of the light-magnifier apparatus to the hand-held video computer apparatus or game. Generally, the means to attach includes ridges at one end of the body and on one side of the body and optionally on the bottom surface of the battery compartment through the employment of elongated, raised ridges to secure releasably the body of the light apparatus directly onto the compact computer device in a snap-in fashion. Generally, the attachment means would comprise a pair of ridges, one extending on the top and bottom surface of the body and another ridge extending from the bottom surface of the battery compartment, with both of the ridges placed in a snap-in fashion within grooves in the Game Boy ® device so that the light apparatus may be releasable secured in a snap-in fashion and to permit the lateral adjustment to place the viewing space directly over and aligned with the open viewing space directly over the video screen of Game Boy ® computer device.

The combined light and magnifying apparatus of the invention includes a cover of a shallow depth with generally the cover having a solid base and of a size and dimension to fit over the viewing screen of the computer hand-held device. The cover has a one and the other end and is pivotably secured at the one end on the face side of the body of the light apparatus. The cover is adapted to move between a closed, compact position closely adjacent to and in general alignment and parallel to the face side of the body of the light apparatus which represents a closed, compact, non-use position, and an open position wherein the cover extends generally perpendicularly outwardly from the one end of the body of the light apparatus a defined distance, the distance being generally associated with the focal length of the particular magnifying lens employed in the magnifying apparatus.

The combined light and magnifying apparatus of the invention includes a magnifying apparatus which comprises a frame having a one and the other end, and magnifying lens. The magnifying lens may be releasably and removably placed within the frame, such as by retainer clips, or laterally slid into the frame from one side, or merely securely placed within the frame or adhesively bound or integrally formed with the frame. The transparent magnifying lens of glass or plastic is adapted to conform generally in size and dimension with the video screen of the computer device, and has a selected focal length so as to enhance the images or information on the video screen at a defined distance which is generally the distance of the outwardly extended cover. The frame and the magnifying lens within the frame are pivotably secured at one end to the other end of the cover and within the cover. The frame and magnifying lens are adapted to move between a compact, non-use stored position wherein the frame and the magnifying lens are nestled within the shallow depth of the cover, generally parallel to the plane of the cover, and a magnifying use position extending generally perpendicularly from the other end of the cover and over the video screen of the computer device to magnify the lighted information on the video screen for the user. Optionally, but preferably, the frame of the magnifier apparatus contains an outwardly extending tab at the other end so as to enable the user to press the outwardly extending tab to remove frame and magnifying lens easily from the compact, stored position within the cover to an extended, magnifying position over the video screen.

In addition, optionally, but preferably, a snap-in indent means is provided at the other end of the frame and on the pivotable end of the cover, so that when the frame and magnifying lens are moved from a compact to a magnifying use position, the frame and magnifying lens frictionally override the raised tab or indent and are retained in an extended position over and parallel to the face of the LCD screen of the computer device and which indent means may be easily overcome by the user in returning the frame and magnifying lens from the magnifying, use position to the stored, compact position within the cover.

The invention includes a method to provide light to and magnification of a video screen of a hand-held computer which method comprises releasably securing onto a hand-held computer with a video screen a light-magnifier apparatus having a body which defines an open video viewing space which mimics the video screen; lighting the open video viewing space employing a battery power source to improve the visibility of the image on the video screen; providing a cover pivotably mounted to the body to move between a compact, stored position wherein the cover extends over and protects the open viewing space, and a use position extending outwardly from the body which permits the lighting of the open viewing space or magnification of the video screen; pivotably moving a magnifying lens in the cover between a non-use position within the cover and a use position when the magnifying lens extends outwardly from the cover in the cover use position over the video screen to permit magnification of the image on the video screen.

The combined light and magnifying apparatus of the present invention provides for the both lighting and magnifying the images on the video screen in a combined apparatus and which permits either lighting or magnification or both to occur independently. The entire combined light and magnifying apparatus is typically composed of an integrally molded plastic which is easily manufactured and assembled. The light apparatus may be used independently of the magnifying apparatus, that is, the cover may be pivotably opened into its extended position and the frame and magnifying lens retained in the stored position within the outwardly extended cover, while the video screen may merely be indirectly lighted by the light apparatus. Likewise, the magnifying lens may be placed in a magnifying, use position and the light apparatus not employed by the non-activation of the "on/off" switch. The solid bottom of the cover provides protection for the magnifying lens in the stored or compact position and provides a compact package which may be easily carried by the user. The cover in the closed position also provides protection for the light apparatus by enclosing the video viewing area and the lighting means within the body from any inadvertent damage.

The combined light and magnifying apparatus of the invention will be described for the purposes of illustration only in connection with certain embodiments; however, it is recognized that those persons skilled in the art may make various modifications, changes, additions and improvements to the illustrated embodiments without departing from the spirit and scope of the invention.

DESCRIPTION OF THE EMBODIMENTS

Figure 1:
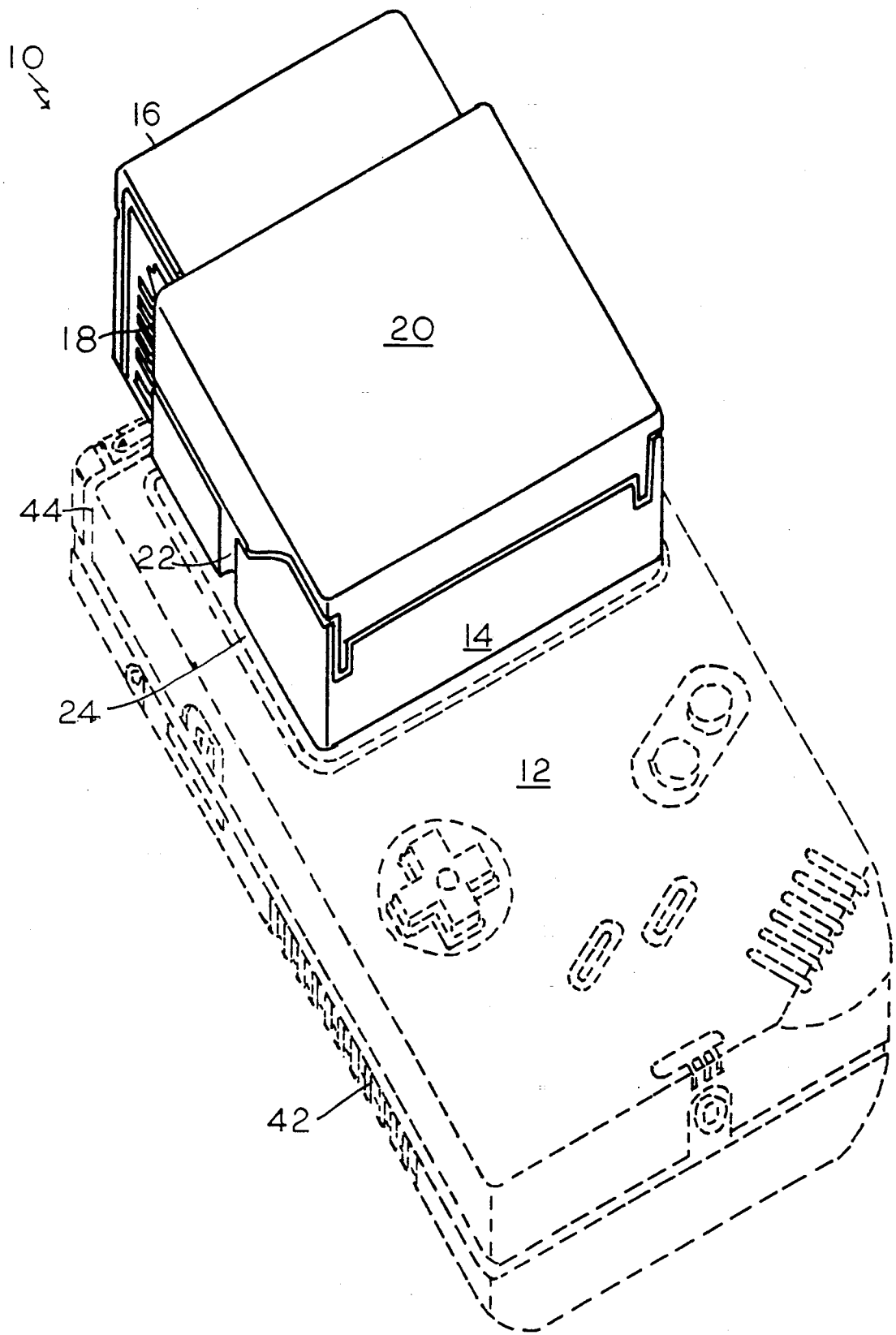
FIG. 1 is a perspective view from above of the light-magnifier apparatus of the invention in a closed position.
Figure 15:
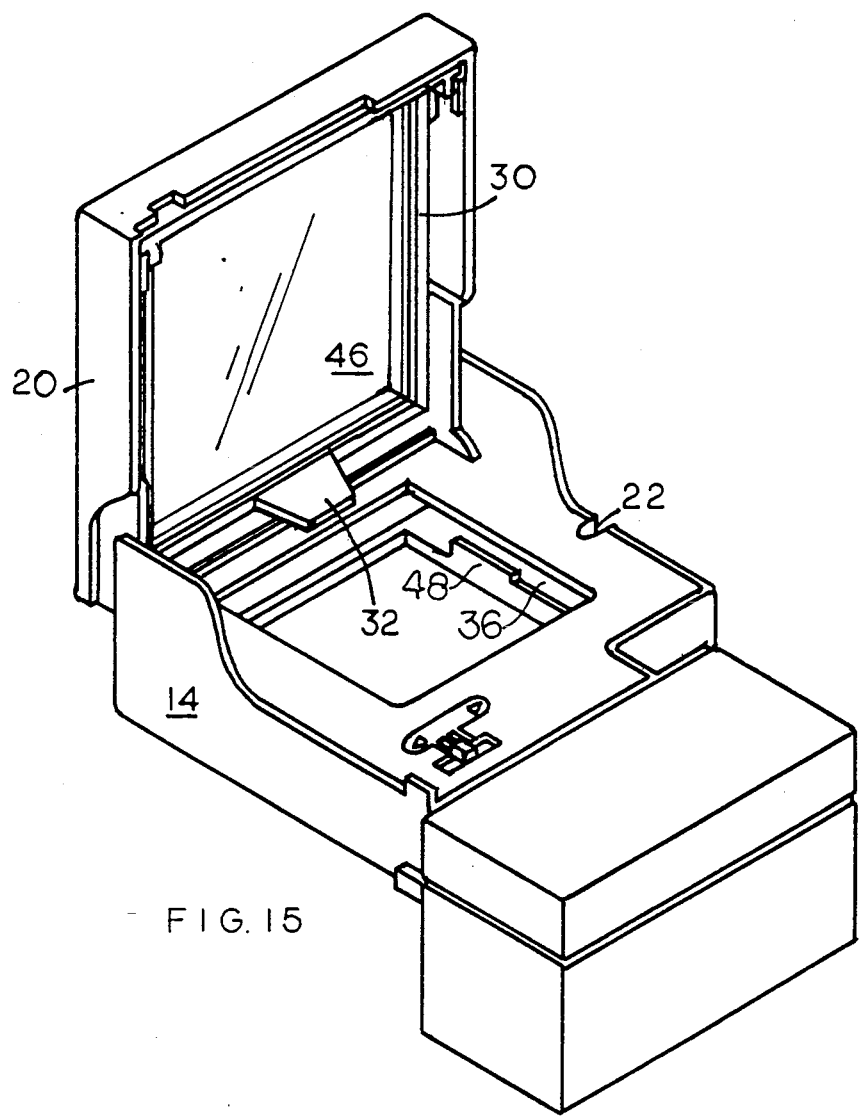
FIG. 15 is a perspective view from above of the combined light-magnifier apparatus in a light viewing, non-magnifying viewing position.

With reference to the drawings, there is shown a combined, compact light and magnifier apparatus 10 releasably secured to a Game Boy ® computer video device 12 having a video screen 24. The apparatus 10 is shown in a stored, compact, releasably secured position (FIG. 1), an extended magnifier and light use position (FIG. 2) and an extended non-magnifier, light use position (FIG. 15). The apparatus 10 made of injection molded plastic includes a base 14 with a battery compartment 16 with a sliding, snap-in door 18 for the insertion of batteries to provide power for lights (not shown). The base 14 includes a shallow depth, solid cover 20 pivotably secured to the one end of the base 14 (see FIGS. 2 and 15) to permit the cover to extend generally perpendicular from the base 14. The base 14 includes a side opening 22 to permit the user to observe an on/off light on the face of the device 12. The device 12 includes a lateral, peripheral groove 42 and a top groove 44, while the bottom surface of the battery compartment 16 includes an elongated raised ridge 38 and the top face surface of the base 14 includes an elongated raised ridge 40, which ridges 38 and 40 are adapted to snap into their respective grooves 42 and 44 to releasably secure apparatus 10 to device 12.

The apparatus 10 includes an on/off electrical switch 26 to operate light bulbs (not shown) positioned on either side and behind slightly raised opposing side panels 48 (see FIG. 15) placed in front of four light-colored, square side panels 36 which define the open space 46 which mimic the LSD view screen 24 of device 12 to provide indirect, reflective light onto the open space 46. The apparatus 10 includes a frame 30 surrounding and holding a generally rectangular magnifier lens 28, the frame 30 pivotably mounted within the depth of the cover 20 at the one end and adapted to move between a non-use, stored position with the frame 30 and lens 28 fitting within the depth of the cover 20 (see FIGS. 1 and 3-10) and a magnifier lens 28 use position wherein the frame 30 and lens 28 extend outwardly generally perpendicular to the extended cover 20 and over the video screen 24 and parallel thereto with a distance of about the focal lens length to magnify the image on the screen 24. The frame 36 includes a raised central tab 32 at the other end of the frame to aid the user in extending the frame 30 and lens 28 to the use position, which tab in a stored position extends into the viewing space 46 defined by the side panels 36.

The cover includes on either side at the other end raised indents which cooperate with the top of the frame 30, so that the frame is frictionally retained in the extended use position, but which frame 30 can be retained in the non-use, stored position by hand pressure of the user.

FIG. 15 is an illustration wherein the frame 30 and lens 28 are in a stored, non-extended position within the cover 20, while the user may light up the open viewing space 46 and video screen 24 employing only the light apparatus.

Figure 2:
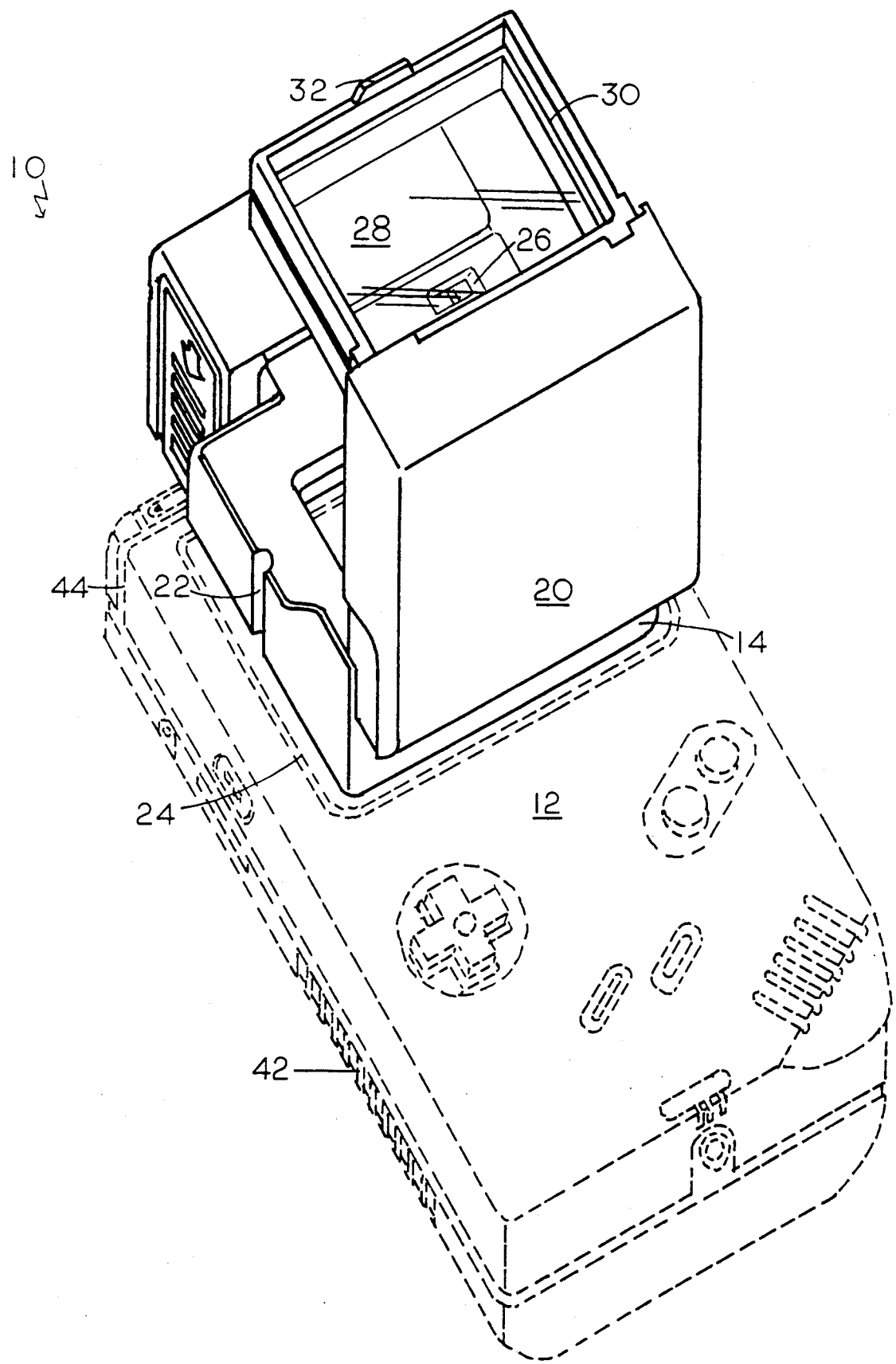
FIG. 2 is a perspective view from above of the light-magnifier apparatus of the invention in an open position.
Figure 3:
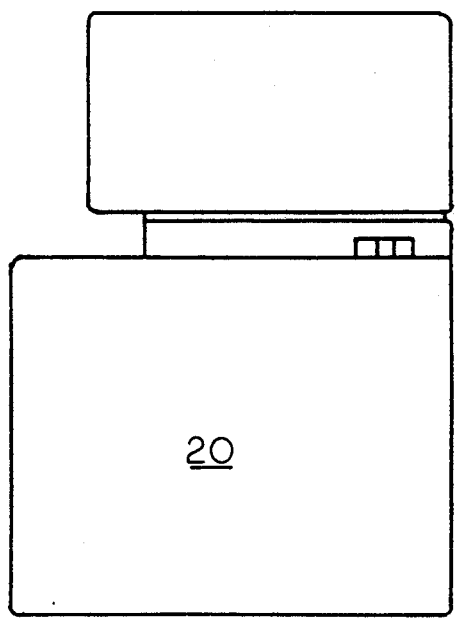
FIG. 3 is a back elevational view of the light-magnifier apparatus of FIG. 1.
Figure 4:
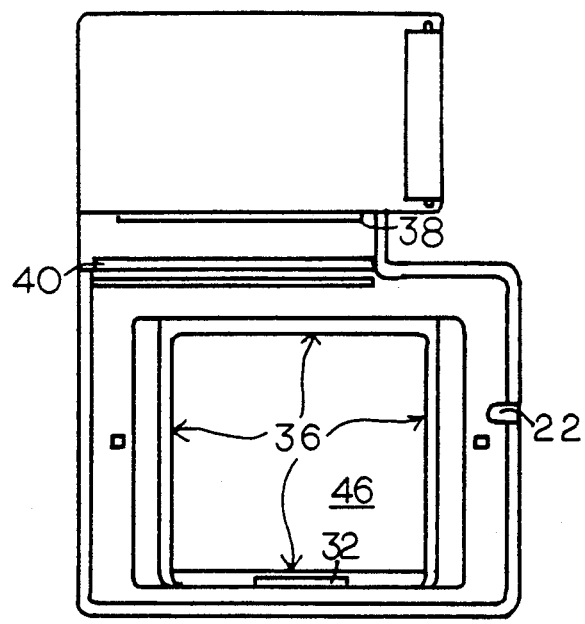
FIG. 4 is a front elevational view of the light-magnifier apparatus of FIG. 1.
Figure 5:
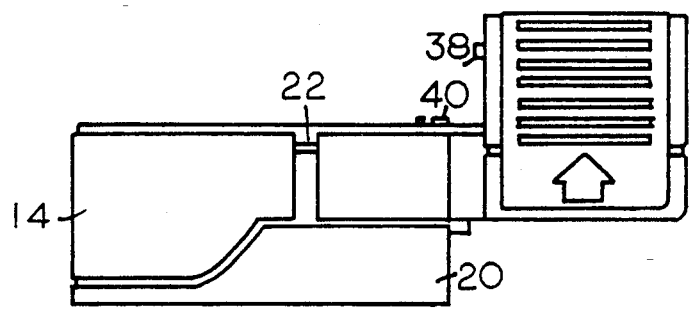
FIG. 5 is a side elevational view of the light-magnifier apparatus of FIG. 1.
Figure 6:
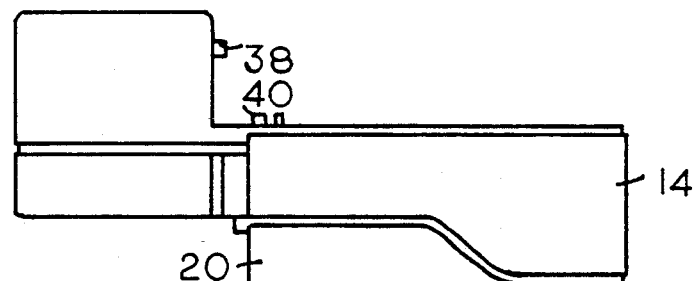
FIG. 6 is the other side elevational view of the light-magnifier apparatus of FIG. 1.
Figure 7:
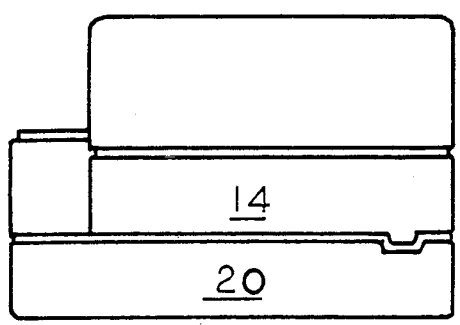
FIG. 7 is a top plan view of the light-magnifier apparatus of FIG. 1.
Figure 8:
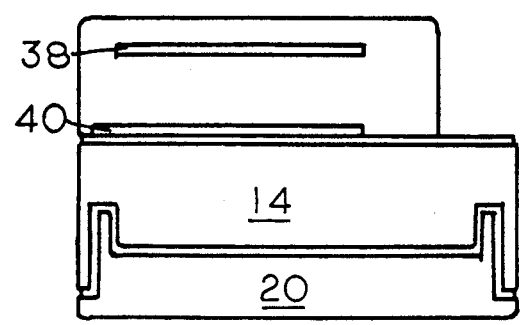
FIG. 8 is a bottom plan view of the light-magnifier apparatus of FIG. 1.
Figure 9:
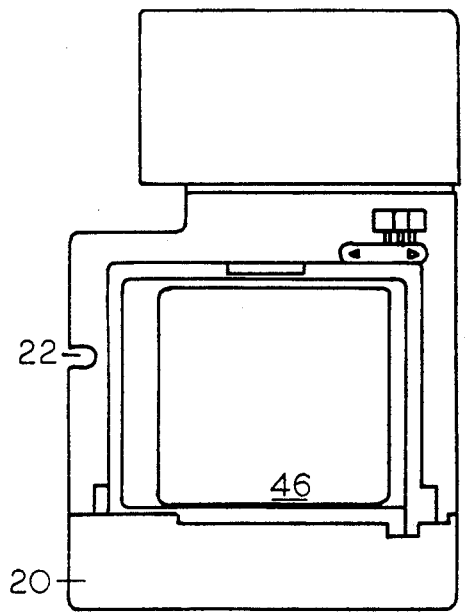
FIG. 9 is a front elevational view of the light-magnifier apparatus of FIG. 2.
Figure 10:
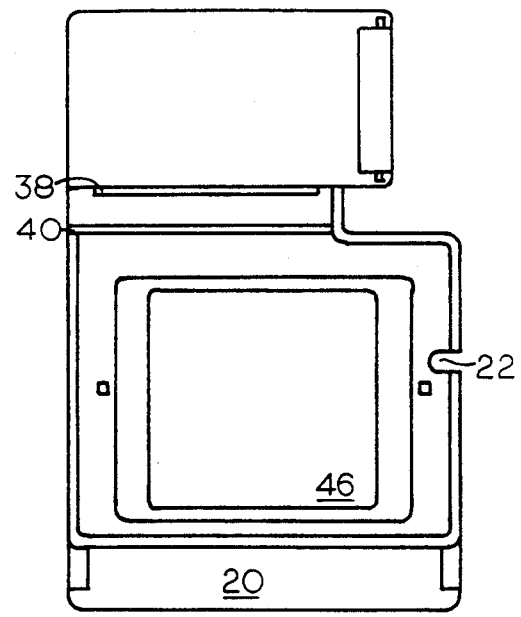
FIG. 10 is a back elevational view of the light-magnifier apparatus of FIG. 2.
Figure 11:
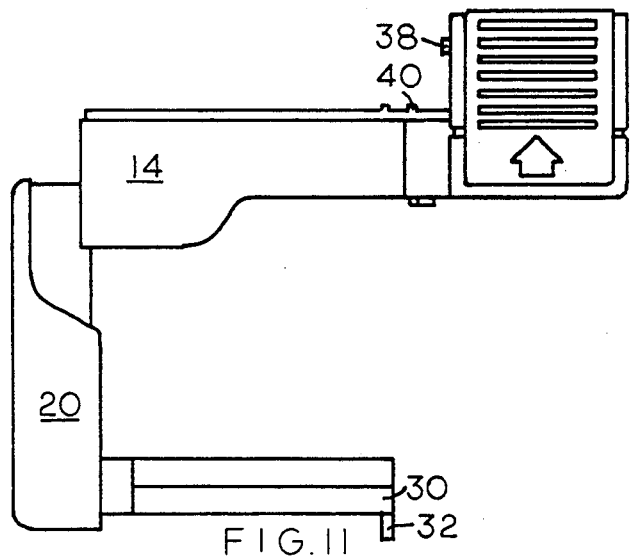
FIG. 11 is a side elevational view of the light-magnifier apparatus of FIG. 2.
Figure 12:
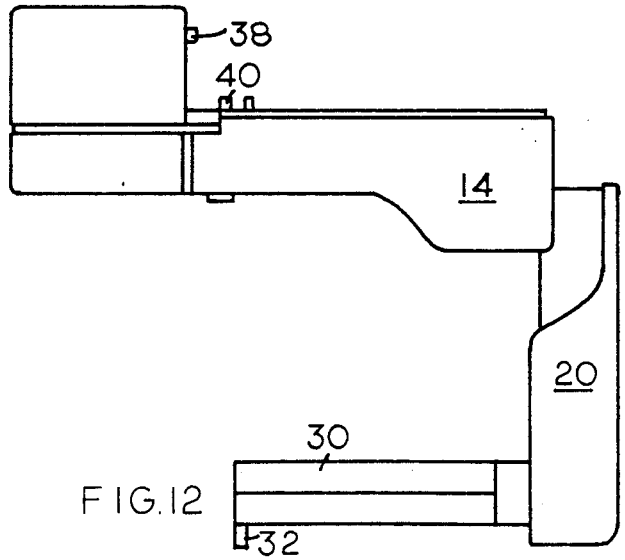
FIG. 12 is the other side elevational view of the light-magnifier apparatus of FIG. 2.
Figure 13:
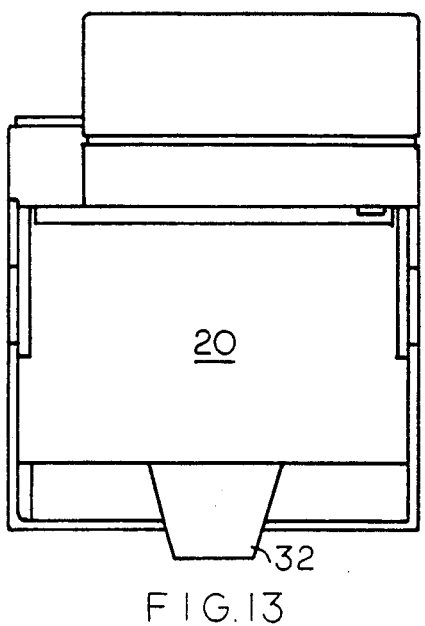
FIG. 13 is a top plan view of the light-magnifier apparatus of FIG. 2.
Figure 14:
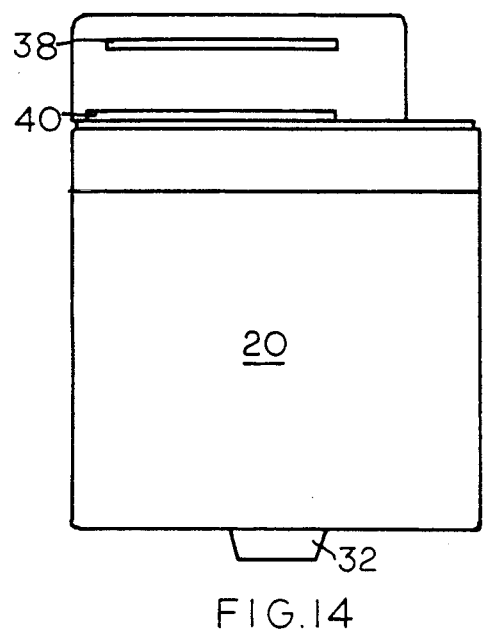
FIG. 14 is a bottom plan view of the light-magnifier apparatus of FIG. 2.

Likewise, the lens 28 may be used in the use position without the operation of the light portion of the apparatus 10 (as in FIG. 2).

As illustrated, the combined light and magnifier apparatus provides a compact apparatus with both light and magnifying functions which can be used separately or in combination.

What is claimed is:

1. A compact, combined light and magnifying apparatus for use with a hand-held computer having a video screen, which combined apparatus comprises:
   a) a light means to enhance the view of the video screen, which light means comprises:
      i) a body having a one and the other end and a face and bottom surface which defines an open video viewing space, the video viewing space adapted to conform generally to the area of the computer video screen to be lighted;
      ii) a battery power source;
      iii) light means within the body to provide light to the computer video screen;
      iv) an electrical switch to control the power from the power source;
      v) electrical circuitry means to connect the light means, the switch and the power source;
      vi) attachment means to secure releasably the body of the light means on to the hand-held computer with the open viewing space positioned over the video screen of the computer;
   b) a cover having a one and the other end, the one end of the cover pivotably secured to the other end of the body of the light means on the face side of the body, the cover adapted to move between a closed, compact position closely adjacent to and over the video viewing space of the body and an open position extending generally perpendicularly outwardly from the other end of the body from the face surface of the body a defined distance; and
   c) a magnifier means which comprises a frame having a one and the other end and a magnifying lens, the magnifying lens adapted to conform generally to the dimension of the video screen, the one end of the frame pivotably secured to the other end of the cover, the frame with the magnifying lens adapted to move between a compact, stored position with the frame and the magnifying lens snugly fitting within the cover and generally parallel to the plane of the cover and a magnifying, use position extending generally perpendicularly outwardly from the other end of the cover and over the video screen and the video viewing space of the body to magnify the information on the video screen, thereby providing a compact, separately operable light and magnifying apparatus for use in enhancing the view of a video screen of a hand-held computer.

2. The apparatus of claim 1 wherein the attachment means comprises raised ridges on the bottom surface of the body which ridges are adapted to be placed in a snap-in releasably fashion into matching grooves on a hand-held computer game.

3. The apparatus of claim 2 wherein the battery power source comprises a battery compartment at the one end of the body and adapted to receive one or more batteries as a power source for the lighting means.

4. The apparatus of claim 3 wherein the battery compartment includes a bottom surface and a raised ride on the bottom surface, which ridge is adapted to be place din a snap-in, releasable fashion into a matching groove on the hand-held computer.

5. The apparatus of claim 1 wherein the frame at the other end includes a raised handle means to permit user to move pivotably the frame and the magnifying lens from the compact to the extended positions.

6. The apparatus of claim 1 wherein the frame includes at the other end an indent means to retain the frame and magnifying lens in an extended, magnifying, use position which indent means may be overcome by the user to restore the frame and magnifier lens to the compact stored position within the cover.

7. The apparatus of claim 3 which includes one or more batteries positioned in the battery compartment.

8. The apparatus of claim 1 wherein the body of the light means includes four light colored panels to define a generally rectangular open viewing area.

9. The apparatus of claim 8 which includes two opposing, raised side panels spaced apart from the light colored panels and the lighting means includes light bulbs behind said opposing side panels to provide indirect, reflective light to the open viewing space.

10. A hand-held computer having a video screen for viewing by a user and which includes releasably attached thereto the combined light and magnifier apparatus of claim 1.

11. A method to provide light to and magnification of a video screen of a hand-held computer, which method comprises:
   a) releasably securing on to a hand-held computer with a video screen a light-magnifier apparatus having a body which defines an open video viewing space which mimics the video screen;
   b) lighting the open video viewing space employing a battery power source to improve the visibility of the image on the video screen;
   c) providing a cover pivotably mounted to the body to move between a compact, stored position and a use position extending outwardly from the body which permits lighting of the open viewing space or magnification of the video screen;
   d) pivotably moving a magnifying lens in the cover between a non-use position within the cover and a use position when the magnifying lens extends outwardly from the cover in the cover use position over the video screen to permit magnification of the image on the video screen.

12. The method of claim 11 which includes releasably securing the light-magnifier apparatus to the hand-held computer through employing snap-in matching grooves and ridges.

13. The method of claim 11 which includes lighting the open video space and the underlying video screen by indirect, reflective light about the open viewing space of the body.

14. The method of claim 11 which includes providing a battery compartment integrally secured to the body with batteries as a power source for lighting the open viewing space.

* * * * *

UNITED STATES PATENT AND TRADEMARK OFFICE
CERTIFICATE OF CORRECTION

PATENT NO. : 5,165,779
DATED : November 24, 1992
INVENTOR(S) : Angelo Tortola/Robert Howitt It is certified that error appears in the above-identified patent and that said Letters Patent is hereby corrected as shown below:

On the title page:

[73] Assignee: delete "Curtic" and insert --Curtis--.

[63] After "Pat. No. 5,091,832" delete "." and insert --, which is the national phase of PCT/US90/03966, filed July 11, 1990.--

Signed and Sealed this

Ninth Day of November, 1993

Attest:

BRUCE LEHMAN

Attesting Officer

Commissioner of Patents and Trademarks